US012614168B2

(12) United States Patent
Nguyen

(10) Patent No.: US 12,614,168 B2
(45) Date of Patent: Apr. 28, 2026

(54) METHOD FOR SECURING CRYPTOCURRENCY WALLETS

(71) Applicant: NINETY EIGHT COMPANY LIMITED, Ho Chi Minh (VN)

(72) Inventor: Vinh The Nguyen, Ho Chi Minh City (VN)

(73) Assignee: Ninety Eight Company Limited, Ho Chi Minh (VN)

( * ) Notice: Subject to any disclaimer, the term of this patent is extended or adjusted under 35 U.S.C. 154(b) by 0 days.

(21) Appl. No.: 19/228,886

(22) Filed: Jun. 5, 2025

(65) Prior Publication Data

US 2025/0378438 A1 Dec. 11, 2025

Related U.S. Application Data

(63) Continuation of application No. PCT/VN2024/000011, filed on Sep. 19, 2024.

(30) Foreign Application Priority Data

Oct. 18, 2023 (VN) .............................. 2-2023-00618

(51) Int. Cl.
*G06Q 20/36* (2012.01)
(52) U.S. Cl.
CPC ................................. *G06Q 20/3674* (2013.01)
(58) Field of Classification Search
CPC ........................................... G06Q 20/00–425
See application file for complete search history.

(56) References Cited

U.S. PATENT DOCUMENTS

| | | | | |
|---|---|---|---|---|
| 10,742,422 B1 * | 8/2020 | Jarjoui | .................. | H04L 9/0631 |
| 2016/0005032 A1 | 1/2016 | Yau et al. | | |
| 2022/0224530 A1 * | 7/2022 | Jeoung | .................. | H04L 63/126 |
| 2022/0398561 A1 | 12/2022 | Hill et al. | | |

FOREIGN PATENT DOCUMENTS

| | | |
|---|---|---|
| KR | 2020-0012079 A | 2/2020 |
| KR | 2023-0041394 A | 3/2023 |

OTHER PUBLICATIONS

Fmtad, 'Why choose a Cold Wallet NFC HSM to secure your cryptocurrencies?', Articles, Evivault Technology, News, Uncategorized, Sep. 10, 2023, [retrieved on Dec. 13, 2024], Retrieved from: <URL: https://freemindtronic.com/secure-cryptocurrencies-cold-wallet-nfc-hsm.
International Search Report for International Patent Application No. PCT/VN2024/000011 (Dated Jan. 14, 2025).

* cited by examiner

*Primary Examiner* — Mohammad A. Nilforoush
(74) *Attorney, Agent, or Firm* — Alumen IP Law PC

(57) ABSTRACT

The present invention relates to a method for securing cryptocurrency wallets to increase cryptocurrency wallet security by having a private key encrypted along with a user terminal device and one of the previously encrypted solution-specific default passwords, which is split into two segments, one segment is stored at the user terminal device, the other segment will be stored in the NFC cards.

4 Claims, 1 Drawing Sheet

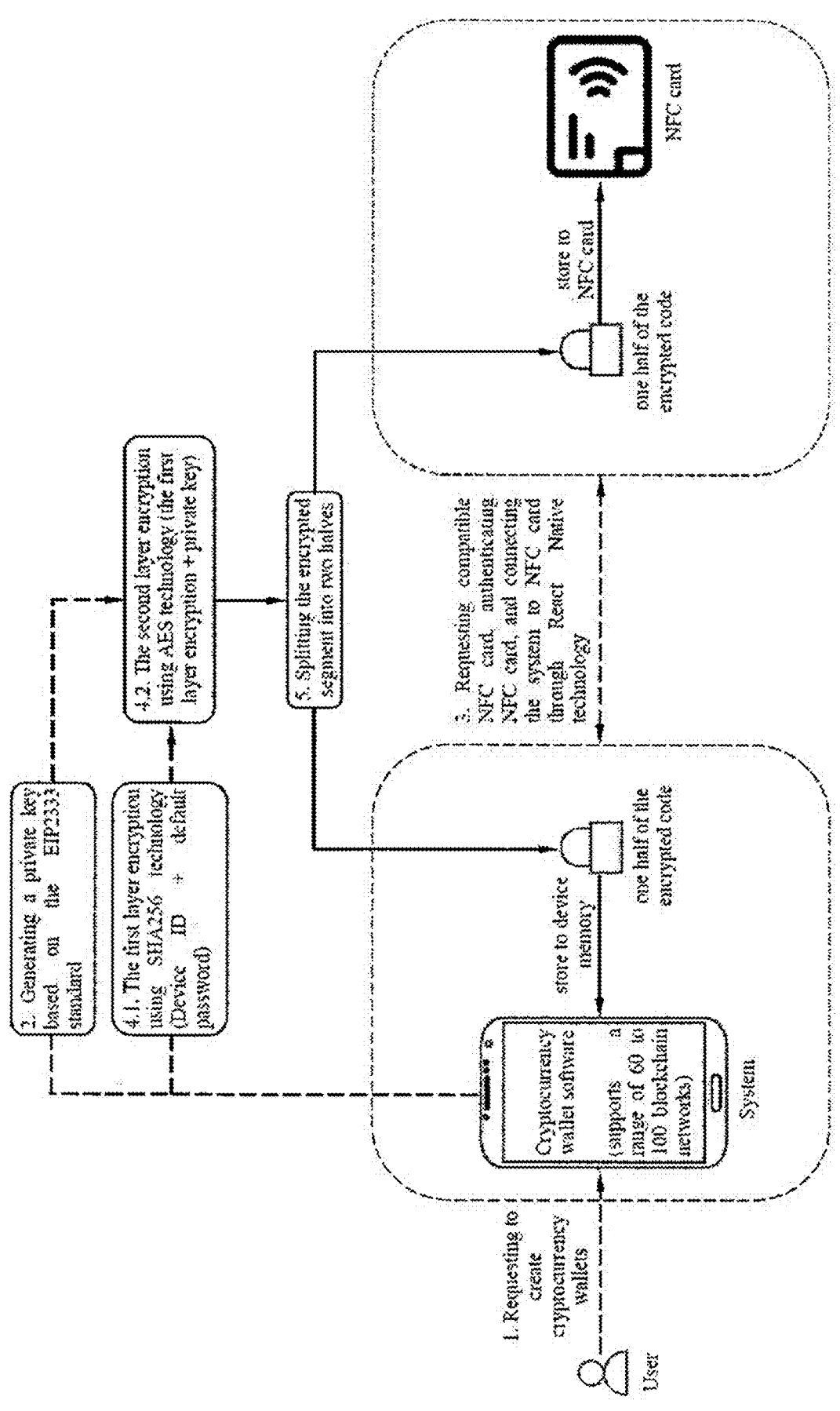

METHOD FOR SECURING CRYPTOCURRENCY WALLETS

TECHNICAL FIELD

The present invention relates to a method for securing cryptocurrency wallets used in the field of blockchain technology, specifically a method for enhancing the security of cryptocurrency wallets by changing the mechanism of storing security keys.

BACKGROUND ART

Traditional database technologies pose many challenges in recording financial transactions. For example, in the transaction of buying and selling an asset, after the payment is made, the ownership of the asset is transferred to the buyer. However, if an issue arises post-transaction, the seller can easily claim that they have not received the payment even if they have, and the buyer can counter that they have transferred the payment even if they have not paid. To avoid potential legal issues, a trusted third party is needed to oversee and authenticate transactions. The presence of this central party not only complicates the transaction but also creates a vulnerability. If the central database is compromised, both parties can suffer losses. Therefore, blockchain technology emerged to mitigate such problems by creating a tamper-proof, decentralized system to record transactions. In the case of asset transactions, both the buyer and the seller are provided with individual ledgers by the blockchain. All transactions must be approved by both parties and are automatically updated in real-time in both ledgers. Any error in previous transactions will result in discrepancies throughout the entire ledgers. These characteristics of blockchain technology have led to its use in various fields, including the creation of cryptocurrencies.

Cryptocurrency is a form of digital asset used similarly to real-world assets as a medium of exchange but conducted on blockchain technology platforms. A cryptocurrency wallet is a software that interacts with blockchain technology by generating a pair of security keys: a public key and a private key or a seed phrase. These keys are used to monitor balances, send and receive cryptocurrency assets, and interact with decentralized applications. The private key, also known as the secret key, is a cryptographic variable used with an algorithm to encrypt and decrypt data. It is a string format that includes both numbers and letters and is used to connect to the cryptocurrency wallet account. The private key is the most critical piece of the cryptocurrency wallet, typically stored on devices such as phones and computers, and is used to verify transaction requests. The recovery phrase, also known as the seed phrase, is a sequence of words generated by the cryptocurrency wallet to provide access to the cryptocurrency assets associated with that wallet. The seed phrase acts like a master password in a cryptocurrency asset password manager. It grants access to all cryptocurrency assets linked to the wallet, even if the wallet has been deleted or lost. The seed phrase is a string of 12 to 24 simple words such as "army", "energy", "fabric", "lucky", "opera", "hero", "trash" or "flowers" instead of a numeric password because long numeric strings are very difficult to remember or accurately transcribe. Therefore, the seed phrase should not be disclosed to anyone. The private key allows for sending or spending cryptocurrency assets. It is derived algorithmically from the long numeric string represented by the seed phrase. The seed phrase provides access to the cryptocurrency wallet and all the private keys within it. Thus, the cryptocurrency wallet can be viewed as a password manager for cryptocurrency assets, as long as the seed phrase is kept secure. Currently, in the blockchain technology industry, there are two types of cryptocurrency wallets: hot wallets and cold wallets.

Hot wallets are types of wallets used directly on mobile applications, websites, or computer software. They are directly connected to the internet to perform cryptocurrency transactions. Information such as private keys is usually stored and encrypted directly on the hot wallet software and operates directly on the internet. Therefore, using hot wallets often comes with many risks, such as vulnerabilities in the wallet software, hacker intrusions, or malware attacks that steal information. Well-known hot wallet software include Metamask, Trust Wallet, etc. The biggest disadvantage of hot wallets is the storage of a full private key in a user terminal device and online usage on the internet, which makes them highly susceptible to hacking and theft of cryptocurrency wallet information. Additionally, users need to trust that the software developers do not store or sell their private keys elsewhere. When using hot wallets and interacting with decentralized applications, users need to be cautious about requests to sign transactions, as this can easily lead to the theft of their entire cryptocurrency assets.

Cold wallets are typically hardware devices that are not connected to the internet, making them more secure than hot wallets. Information such as private keys is stored within the hardware of the cold wallet and is not saved on any software. All interactions with decentralized applications via a cold wallet require user authorization directly on the cold wallet device. Well-known cold wallets include Ledger, Trezor, etc. However, the disadvantages of cold wallets include the relatively high investment cost, starting at around 150 USD or more. Users must also perform several additional steps to use the cold wallet, such as logging into the cold wallet, connecting the cold wallet to a computer or phone, and signing transactions. Additionally, cold wallets can be inconvenient and easy to lose if carried around. Although cold wallets offer much higher security than hot wallets, there is still a risk of information theft if the user interacts with applications containing malware.

Additionally, the common disadvantage of both hot and cold wallets is only store the entire private key on the device or software for transactions, and cannot be saved on the cloud, which is the biggest factor leading to the risk of data breaches. Moreover, both hot and cold wallets lack personalization, as their interfaces are mostly designed to be generic for all users.

Recently, there has been development in the market for cryptocurrency wallets stored using Near-Field Communication (NFC) technology, which uses a wireless connection standard over short distances. However, this technology and its solutions are not yet fully developed or widely adopted. In this method, the private key is either stored entirely on an NFC card or stored entirely in software on a phone or computer, with the NFC card used solely for transaction authentication. Similar to cold wallets, the private key is stored entirely on the NFC card, but there is a risk of information theft or loss of cryptocurrency assets if the NFC card is lost.

The NFC card includes NFC Type A card and NFC Type B card. NFC Type A card is one of the wireless connection standards used in mobile devices, smart cards, mobile payments, data communication, and identity authentication. NFC Type A card, based on the ISO 14443-3A standard, is the wireless communication protocol between the reader device and the smart card. It operates at a frequency of 13.56 MHz and has a data transfer rate of approximately 106 kbit/s.

Therefore, each cryptocurrency wallet address consists of a public key and a private key. The private key is the most crucial component and requires strict security measures. However, with current market technologies, the private key needs to be stored within the cryptocurrency wallet to facilitate transactions. This dependency on storing the private key within the wallet software is a primary reason why users can fall victim to theft of their private keys during usage.

U.S. Pat. No. 10,992,469 B2 discloses a method and system for securely splitting seed phrases and expanding a foundational program for backing up, restoring, and duplicating cryptocurrency keys, as well as methods and devices for transaction authentication platforms. However, this solution requires significant investment in hardware security modules (HSMs) for storage and verification, which demands high technical expertise and incurs substantial costs in both investment and operation. Moreover, multiple HSMs are needed to verify a single transaction, complicating transaction flow control. The proposed method for securing cryptocurrency wallets in this invention may partially address the limitations mentioned in the prior art.

SUMMARY

Accordingly, the first purpose of the invention is a method for securing cryptocurrency wallets to increase cryptocurrency wallet security to be better than all other forms of cryptocurrency wallets currently on the market by having a private key encrypted along with a user terminal device and one of the previously encrypted solution-specific default passwords, which is split into two segments, one segment is stored at the user terminal device, the other segment will be stored in the NFC card instead of being completely stored on a device or software of other wallets.

The second purpose of the invention is the method for securing cryptocurrency wallets to enhance the convenience and security of cryptocurrency wallet transactions by storing a portion of a private key in an NFC card, allowing transactions to be conducted simply by tapping the user terminal device.

The third purpose of the invention is the method for securing cryptocurrency wallets that have higher security measures at a very low investment cost.

The fourth purpose of the invention is the method for securing cryptocurrency wallets that facilitates easy operations such as restoration, new installation of NFC cards, or the cryptocurrency wallet software on a new user terminal device without the risk of completely losing the cryptocurrency wallet when one of the user terminal devices storing the private key is lost.

The fifth purpose of the invention is for NFC cards to store private keys using the method for securing cryptocurrency wallets, allowing users to customize the card's design according to their preferences.

To achieve the above purposes, according to the first aspect, the invention proposes the method for securing cryptocurrency wallets involves a system consisting of user terminal devices and cryptocurrency wallet software, wherein the method includes the following steps:

creating a cryptocurrency wallet on the system by the user, through the user terminal device;

generating a private key, by the system, based on the EIP2333 (Ethereum improvement proposal 2333) standard;

authenticating the cryptocurrency wallet using an NFC card, including:

placing the NFC card with a compatible data field installed, where the compatible data field is a data format that can be read from and written to the NFC card, near the user terminal device, receiving, by the user terminal device, signals from the NFC card using React Native technology along with the React Native NFC Manager library to authenticate the cryptocurrency wallet;

encrypting the private key, by the system, using two-layer encryption technology in the following sequence:

the first layer encryption: taking the combination of a user terminal device identifier (Device ID) and one of the specific default passwords of the solution, encrypted using a 256-bit secure hash algorithm, also known as SHA256 (Secure Hash Algorithm 256-bit), and resulting in the generation of a first-layer encrypted segment, and the second layer encryption: taking the combination of the first layer encrypted segment and the private key generated earlier, then encrypting it again using the AES (Advanced Encryption Standard) block cipher method, resulting in the generation of the private key encryption segment; and the encrypted segment is then split into two halves, one half is stored in the memory of the user terminal device, and the other half is written into the data field on the NFC card.

According to the second aspect, the method for securing cryptocurrency wallets according to the first aspect, in which the NFC cards used are NFC Type A cards and are personalized with customizable patterns according to user preferences.

According to the third aspect, the method for securing cryptocurrency wallets according to the first aspect, in which the system supports a range of 60 to 100 blockchain networks.

According to the fourth aspect, the method for securing cryptocurrency wallets according to the first aspect, in which the user terminal devices are mobile phones, tablets, or computer devices.

Effect of Invention

As a result of the method for securing cryptocurrency wallets according to this invention, the following advantages have been achieved:

Cost savings with only ⅓ of the investment compared to other methods, yet with higher security.

The compact size of the NFC card for transaction authentication, similar to credit card size, makes it easy to carry.

Convenient transaction execution with a single touch of the NFC card to the user terminal device, without needing passwords or multiple connection steps.

Ease of replacement and restoration of NFC cards or new user terminal devices.

Personalization is possible through design patterns on the NFC card.

BRIEF DESCRIPTION OF DRAWINGS

The principles and advantageous features of the invention will become clearer from the following description with accompanying illustration, in which:

FIG. 1 is a diagram showing the steps involved in the method for securing cryptocurrency wallets according to the present invention.

DETAILED DESCRIPTION

To assist those of ordinary skills in this field, a clear and comprehensive description of the technical solutions within the invention approach will be provided below, based on the accompanying diagram. All alternative implementation approaches that can be derived by individuals with ordinary skills in this field without the need for creative effort and based on the implementation plans of the invention will fall within the scope of the invention.

The method for securing cryptocurrency wallets involves encrypting the private key, and then splitting it into two segments stored in two locations: the system and the NFC card. The system comprises user terminal devices and cryptocurrency wallet software. The system supports between 60 to 100 blockchain networks. The method is detailed in the following steps:

Step to Create NFC Card:

Solution using NFC type A card according to ISO 14443-3A standard, the NFC card is personalized by allowing users to design patterns on the card according to their preferences;

Setting up the data field using the NFC Tools application installs a specific data field type within the NFC card, and this data field is compatible only with the solution's system, allowing only this system to read and write data to this specific data field.

As shown in FIG. 1, the method for securing cryptocurrency wallets according to the invention includes the following steps:

Step 1: The users are requested to create cryptocurrency wallets on the system through the user terminal device.

Step 2: The system generates a private key based on the EIP2333 standard.

Step 3: The system authenticates the NFC card by requesting the user to place the NFC card with compatible data fields installed near the user terminal device, the device begins receiving signals from the NFC card using React Native technology along with the React Native NFC Manager library to read and write data onto the NFC card.

Step 4: The system starts encrypting the private key using two-layer encryption technology in the following sequence:

the first layer encryption: taking the combination of the Device ID and one of the specific default passwords of the solution, encrypted using a 256-bit secure hash algorithm, also known as SHA256 (Secure Hash Algorithm 256-bit), and resulting in the generation of the first-layer encrypted segment, and the second layer encryption: taking the combination of the first layer encrypted segment and the private key generated earlier, then encrypting it again using the AES block cipher method, resulting in the generation of the private key encryption segment.

Step 5: After encrypting two layers, the encrypted segment is split into two halves by the system; one half of the encrypted segment is stored in the memory of the user terminal device, and the other half of the encrypted segment is written into the pre-configured data field on the NFC card using the React Native NFC Manager library.

Steps to Perform a Transaction:

Step 1: The users are requested to create cryptocurrency wallets on the system through the user terminal device.

Step 2: The system requests the user to place the NFC card, which has been configured with compatible data fields, near the user terminal device. The device starts receiving signals from the NFC card using the React Native technology along with the React Native NFC Manager library to read and write data onto the NFC card.

Step 3: The system will search for and read the specific data field type configured for the NFC card of the solution. If there is no compatible data field type, the system will not read or retrieve the data. In cases where a compatible data field type is found, the system will proceed to read and decrypt the data, encountering scenarios:

if the Device ID stored on the NFC card is different from the Device ID on the device the user is currently using, the cryptocurrency withdrawal will fail;

if the Device ID matches the Device ID the user is currently using, the system will merge half of the encrypted code from the NFC card with half of the encrypted code in the memory of the user terminal device, resulting in the following scenarios:

if the two halves of the encrypted code merge successfully, the system will use that private key to perform authentication signing; and if the two halves of the encrypted code do not merge correctly, the system will display an error message and ask the user to reconnect or use a different NFC card.

EXAMPLES

Through the process of researching, deploying and testing the method for securing cryptocurrency wallets according to the invention, we have developed a system that includes the cryptocurrency wallet software. This software can be downloaded from the application stores of the Android or iOS operating systems and installed on a user terminal device, which is a mobile phone and an NFC card described as follows:

Step to Create the NFC Card:

Solution using NFC type A card according to the ISO 14443-3A standard, the NFC card is personalized by allowing users to design patterns on the card according to their preferences;

Setting up the data field using the NFC Tools application installs a specific data field type within the NFC card, and this data field is compatible only with the solution's system, allowing only this system to read and write data to this specific data field.

The Method for Securing Cryptocurrency Wallets Includes the Following Steps:

Step 1: The user accesses the cryptocurrency wallet software on their mobile phone to request the creation of the cryptocurrency wallet.

Step 2: The system generates a private key based on the EIP2333 standard.

Step 3: The system authenticates the NFC card by requesting the user to place the NFC card, which has the compatible data recording field installed, near the mobile phone. The mobile phone begins receiving the NFC card's signal through React Native technology and the React Native NFC Manager library to read and write to the NFC card.

Step 4: The system starts encrypting the private key using two-layer encryption technology in the following sequence:

the first layer encryption: taking the combination of the specific Device ID, which is the mobile phone, with one of the solution's default passwords such as "daylamatkhau", "matkhaucuagiaiphap", etc. to encrypt using the secure 256-bit hash algorithm, also known as SHA256 encryption technology, generating the first layer of encryption; and the second layer encryption: taking the combination of the first layer of encryption with the private key generated in Step 3 to encrypt a second time using block cipher methods, also known as AES encryption technology, generating the encrypted private key.

Step 5: After the two layer encryption, the encrypted code is split into two halves by the system. One half of the encrypted code is stored in the mobile phone's memory, and the other half is written into the pre-installed data recording field in the NFC card through the React Native NFC Manager library.

Steps to Perform a Transaction:

Step 1: The user accesses the cryptocurrency wallet software on their mobile phone to request asset withdrawal.

Step 2: The system prompts the user to place the NFC card, which has the compatible data recording field installed, near the mobile phone. The mobile phone begins receiving signals from the NFC card through React Native technology and the React Native NFC Manager library to read and write to the NFC card.

Step 3: The cryptocurrency wallet software searches for and reads the specific data recording field installed on the NFC card. If the compatible data recording field is not found, the cryptocurrency wallet software will not be able to read and retrieve data. In the case where the compatible data recording field is found, the cryptocurrency wallet software proceeds to read and decrypt the data, encountering the following scenarios:

if the specific Device ID, such as a mobile phone, stored on the NFC card is different from the Device ID on the mobile phone the user is currently using, the encrypted asset withdrawal will fail;

if the Device ID matches the code on the user's mobile phone, the cryptocurrency wallet software will merge half of the encrypted code from the NFC card with half of the encrypted code in the mobile phone's memory. The following scenarios may occur:

if the merged encrypted code is successful, the cryptocurrency wallet software will use that private key to perform authentication signing; and if the merged encrypted code is inaccurate, the cryptocurrency wallet software will display an error message and prompt the user to reconnect or use a different NFC card.

Restoring the Encrypted Asset Wallet in Case of Device or NFC Card Damage or Loss:

The cryptocurrency wallet software supports a feature to help users restore the encrypted asset wallet on the new user terminal device or new NFC card. Users simply need to store and enter the seed phrase into the cryptocurrency wallet software to initiate the restoration process.

The invention claimed is:

1. A method for securing cryptocurrency wallets involves a system comprising a user terminal device storing cryptocurrency wallet software, wherein the method includes the following steps:

creating a cryptocurrency wallet on the system by the user, through the user terminal device;

generating a private key, by the system, based on the EIP2333 (Ethereum improvement proposal 2333) standard;

authenticating the cryptocurrency wallet using an NFC (Near-Field Communication) card, including:

placing the NFC card with a compatible data field installed, where the compatible data field is in a data format that can be read from and written to the NFC card, near the user terminal device, receiving, by the user terminal device, signals from the NFC card using React Native technology along with a React Native NFC Manager library to authenticate the cryptocurrency wallet;

encrypting the private key, by the system, using two-layer encryption technology in the following sequence:

generating a first-layer encrypted segment by performing a first layer of encryption, wherein the first layer of encryption comprises encrypting, using a SHA256 (Secure Hash Algorithm 256-bit) hash algorithm, a combination of a user terminal device identifier (Device ID) and a specific default password, and generating a private key encrypted segment by performing a second layer of encryption, wherein the second layer of encryption comprises encrypting, using an AES (Advanced Encryption Standard) block cipher method, a combination of the first-layer encrypted segment and the generated private key;

splitting the private key encrypted segment into two halves; and storing one half in the memory of the user terminal device, and writing the other half into the data field on the NFC card.

2. The method for securing cryptocurrency wallets according to claim 1, in which the NFC card used is an NFC Type A card and is personalized with customizable patterns according to user preferences.

3. The method for securing cryptocurrency wallets according to claim 1, in which the system supports a range of 60 to 100 blockchain networks.

4. The method for securing cryptocurrency wallets according to claim 1, in which the user terminal device comprises one of a mobile phone, tablet, or computer device.

* * * * *